Figure 1:
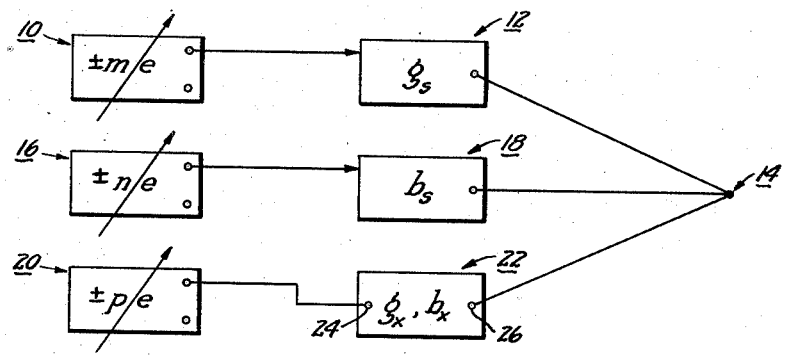

Dec. 24, 1957  C. G. SONTHEIMER  2,817,811
IMPEDANCE MEASURING METHOD
Filed Jan. 2, 1953  2 Sheets-Sheet 1

INVENTOR
*CARL G. SONTHEIMER*
BY
*Curtis, Morris & Safford.*
ATTORNEYS

Dec. 24, 1957    C. G. SONTHEIMER    2,817,811
IMPEDANCE MEASURING METHOD
Filed Jan. 2, 1953    2 Sheets-Sheet 2

INVENTOR
CARL G. SONTHEIMER
BY
Curtis, Morris & Safford
ATTORNEYS

United States Patent Office 2,817,811
Patented Dec. 24, 1957

2,817,811

IMPEDANCE MEASURING METHOD

Carl G. Sontheimer, Riverside, Conn., assignor to C. G. S. Laboratories, Inc., Stamford, Conn., a corporation of Connecticut Application January 2, 1953, Serial No. 329,320

1 Claim. (Cl. 324—57)

This invention is in the field of electrical impedance measurements. The invention provides a method for rapid, easy measurement of impedances of widely different magnitudes over a wide range of frequencies.

In the more usual impedance measuring systems the value of an unknown impedance is compared with that of one or more standard impedance elements. It is ordinarily necessary to provide several calibrated impedance elements which must be continuously variable or variable by fixed steps of sufficiently small magnitude to provide the desired accuracy. Thus, variable inductors, resistors and capacitors may be calibrated and used in measuring instruments, for example, in various types of bridge networks. Calibrated variable resistors are available at reasonable prices and can be adjusted over a wide range of resistance values. Variable capacitors are more difficult to produce and the range of variation is much more limited. Variable inductors are still much more difficult to produce and have the inherent difficulty of introducing significant amounts of resistance and capacitance into the circuit for which compensation must be made if accurate measurements are to be made.

Moreover, impedance measuring systems which are primarily dependent upon continuously variable impedance standards ordinarily must be designed for operation at a particular frequency or over a relatively narrow frequency range.

The present invention is directed to a method of measuring impedance which eliminates the need for variable impedance elements, eliminates the undesirable effects of resistance and capacitance in standard inductance units, and which is capable of being applied so as to measure impedance over a wide range of frequencies.

In a described embodiment, the present method includes: generating three alternating voltages of the same frequency and at least two of which are adjustable in magnitude; coupling the first voltage to a reference point through a fixed standard conductance element, such as a precision resistor of known value; coupling the second voltage to the same reference point through a fixed standard reactance, usually a condenser of known value; coupling the third voltage in circuit with the unknown impedance to the same reference point, and independently adjusting the magnitude of at least two of the alternating voltages to produce a predetermined voltage condition at the reference point which will permit simple computation of the value of the unknown impedance. Most often one output connection of each of the three voltage sources is connected to a common return circuit and the relative magnitudes of the voltages adjusted to produce zero voltage between the reference point and some other point in the measuring circuit.

Further objects, aspects, and advantages of the invention will be in part pointed out and in part apparent from the following description considered in conjunction with the accompanying drawings, in which:

Figure 1 is a block diagram for illustrating the steps of a method embodying the invention; and Figures 2–5 are block diagrams for illustrating modifications of the method to be described in connection with Figure 1.

Figure 1 shows in block diagram form, a system for measuring the magnitude of an unknown impedance. A first source 10 of alternating voltage is connected through a standard conductance unit 12 to a reference point 14; a second source 16 of alternating voltage of the same frequency is connected through a standard susceptance element 18 to the reference point 14; and a third alternating voltage 20 of the same frequency is connected through any electrical apparatus or circuit 22, whose impedance is to be measured to the reference point 14. The three sources of voltage 10, 16, and 20 are considered to be independently variable in magnitude, although in apparatus for carrying out the method it is necessary to provide for the variation of only two of the voltages.

In order to aid in the description of the operation of the invention, certain electrical values are indicated on the various blocks included in the schematic diagram in Figure 1. Thus, the first alternating voltage 10 is "$\pm me$," where "$e$" is an alternating voltage and "$m$" is a coefficient representing its known relative magnitude; as described hereinafter "$m$" is assigned a positive value for convenience in providing a reference for the description. The "$+$" or "$-$" sign indicates the relative phase of the voltage "$me$." In general "$me$" will be positive; however, if the unknown impedance 22 contains negative resistance, then a negative "$me$" may be used for measurement of such negative resistance.

Similarly, the second voltage 16 is "$\pm ne$," where "$e$" has the same meaning as before and "$n$" is a coefficient indicating its known relative magnitude. The voltage "$ne$" may have a positive or negative value; its value will be positive when the reactance component of the unknown is of the same kind as the standard element 18 and negative when of the opposite kind.

Likewise, the voltage 20 is "$\pm pe$," where "$e$" has the same meaning as before and "$p$" is a coefficient indicating its known relative magnitude. The voltage "$pe$" may be of the same phase or opposite phase to the voltage 10 depending upon the way in which the measurement of the voltage at the reference point 14 is made.

By adjusting the magnitudes of the three alternating voltages, i. e. by adjusting "$m$," "$n$," and "$p$," and when necessary adjusting the signs (i. e. to be in phase or out of phase), then certain conditions of voltage relationships can be produced to measure the value of the unknown impedance 22 in terms of the relative magnitudes of the voltages involved and in terms of the values of the standard conductance 12 and susceptance 18.

In general, the application of the voltages as described above will produce a voltage "$a(\phi)e$" at the reference point 14. In this expression "$e$" means an alternating voltage, as before; and "$a(\phi)$" is a coefficient representing its amplitude and phase. The voltage at the common point 14 may, in general, have a phase other than being in phase with the voltage 10.

As shown in Figure 1, the value of the standard conductance 12 is indicated as "$g_s$," that of the standard susceptance 18 as "$b_s$," and the conductance and susceptance of the unknown impedance as "$g_x$" and "$b_x$" respectively.

In Figure 1, the sum of the currents flowing into the reference point 14 is zero; these currents may be expressed as follows, in terms of the values defined above:

$$[me-a(\phi)e]g_s+[\pm ne-a(\phi)e]j^bs+$$
$$[pe-a(\phi)e]g_x+j^bx)=0 \quad (1)$$

Rewriting the terms of the equation:

$$[m-a(\phi)]g_s+[\pm n-a(\phi)]j^bs+$$
$$[p-a(\phi)](g_x+j^bx)=0 \quad (2)$$

The solution for $g_x$ and $b_x$ is:

$$g_x = \left[\frac{m - a(\phi)}{p - a(\phi)}\right] g_s \quad (3)$$

$$b_x = \left[\frac{\pm n - a(\phi)}{p - a(\phi)}\right] b_s \quad (4)$$

It will be noted that Equations 3 and 4 are independent of "$e$" and are in terms only of the relative magnitudes of the voltages.

By measuring the relative magnitude "$a$" and phase "$\phi$" of the voltage of the common connection 14 with reference to the magnitudes of voltages 10, 16, and 20, the conductance and susceptance of the unknown impedance 22 are determined. The unknown susceptance "$b_x$" expressed in Equation 4 may be inductive or capacitive. However, it will be seen that with my method a standard element having a value "$b_x$" (which may be either inductive or capacitive) may be used to measure unknown impedances having either inductive or capacitive components. For example, assuming that the absolute magnitudes of "$n$" and "$p$" are both larger than that of "$a$," then when the signs of "$n$" and "$p$" are both the same, the unknown susceptance "$b_x$" is known to be the same kind as the standard element, which is known, and the opposite is true when the signs of "$n$" and "$p$" differ from each other. Thus, the present method permits measurement of either inductive or capacitive components by adjustment of the voltage sources without changing the standard reactance element.

Figure 2:
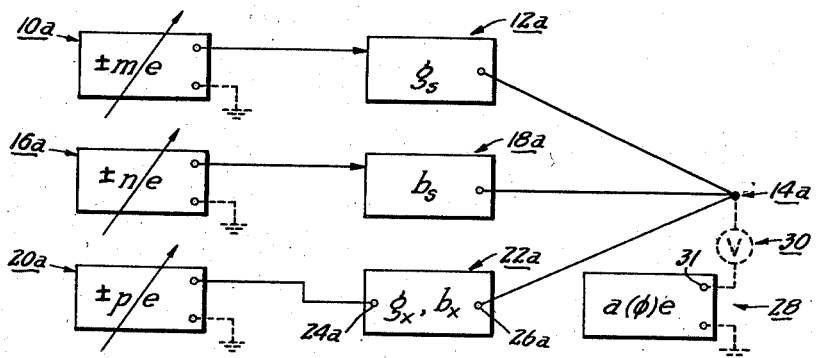

In the succeeding figures, operative components performing functions corresponding to those in Figure 1 are indicated by corresponding reference numerals followed by an identifying suffix. In Figure 2, each of the alternating voltage sources 10a, 16a, and 20a is connected to a common ground or other circuit connecting together each of the indicated terminals. A comparison voltage 28, having a known phase, frequency, and magnitude, and a voltmeter 30 are connected in series between the reference point 14a and the common circuit. The frequency of the voltage 28 is the same as that of the voltages 10a, 16a, and 20a, but its magnitude and phase may be varied. Let the voltage 28 have the value "$a(\phi)e$," and the difference between the voltage at the terminal 31 of the comparison voltage 28 and the common connection 14a being measured by the voltage-responsive device 30 which is assumed to be of sufficiently high impedance to have no significant effect on the values being measured.

If the values of the alternating voltages 10a, 16a, and 20a are adjusted to produce a voltage "$a(\phi)e$" between the reference point 14a and the common circuit, which adjustment is indicated by a null reading of the instrument 30, then the values of "$g_x$" and "$b_x$" are fully determined from Equations 3 and 4, for the relative magnitudes "$m$," "$n$" and "$p$" are known, and the magnitude and phase of the voltage at the point 14a are known to be equal to those of the comparison voltage 28.

Figure 3:
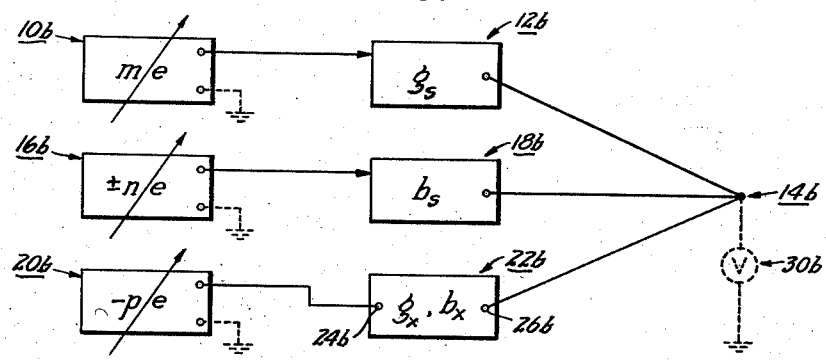

In the arrangement of Figure 3 the voltage of the reference point 14b is measured with respect to the common circuit by a high impedance voltage-responsive device 30b. The relative magnitudes of the voltages 10b, 16b, and 20b are adjusted until a null reading is obtained in the instrument 30b, at which time the reference point 14b is at the potential of the common circuit. Assuming the voltage "$me$" to have a positive value, then the voltage 20b must be "$-pe$," that is negative with respect thereto (i. e. 180° out of phase) in order that the reference point 14b may be adjusted to the potential of the common circuit to produce the desired null reading.

When this adjustment has been made, the term "$a(\phi)$" in Equations 3 and 4 becomes zero, and hence these equations simplify to:

$$g_x = \frac{m}{p} g_s \quad (5)$$

$$b_x = \frac{\pm n}{p} b_s \quad (6)$$

Thus, the unknown impedance is readily determined from the known relative magnitudes "$m$," "$n$," and "$p$" of the three voltages. The plus or minus sign in Equation 6 indicates that a single kind of susceptance standard can be used to measure either kind of susceptance. A negative sign in Equation 5 is not as usual and it would indicate that the unknown conductance is caused by negative resistance. By allowing "$p$" to have a fixed magnitude, the measurement can be made merely by adjusting the relative magnitudes of "$m$" and "$n$."

If desired, the power supply 20b may be arranged to deliver a fixed voltage "$-e$" ($p$ is equal to $-1$). The Equations 5 and 6 then simply to:

$$g_x = mg_s \quad (7)$$

$$b_x = \pm nb_s \quad (8)$$

From the description of my invention above, it will be apparent that it is the relative magnitudes of the voltages 10, 16, and 20 (and in the method shown in Figure 2 that of the comparison voltage 28) which provides the indicated value of the unknown impedance. In order to obtain the highest accuracy of measurement, the relative magnitude of each of these voltages should be independent of the various loads imposed upon it by the adjustment of the other voltages and by various changes in the impedance load caused by the different impedance values being measured. In order to obtain this accurate and rapid determination, voltage-regulated power supplies may be used to obtain the various voltages 10, 16, and 20 and 28. Moreover, in order to obtain measurements at large values of conductance, without disturbing the voltages, the internal impedances associated with each of the voltages should be maintained as small as possible.

An advantage of the methods shown in Figures 1, 2, and 3 is their flexibility in that neither of the terminals 24 nor 26 of the unknown impedance 22 need be connected to a common ground circuit. Moreover, in the methods of Figures 1 and 2, by the suitable choice of the values of "$m$," "$n$," "$p$" and "$a(\phi)$" either or both of these terminals 24a and 26a may be arranged to have an alternating voltage either positive or negative with respect to the common ground circuit. For example, the null indication can be obtained when the alternating voltage of the terminal 24a is equal in magnitude to the alternating voltage of the terminal 26a but out of phase therewith, i. e. negative with respect thereto, whereby shunt capacity effects to ground in the unknown may be reduced to a minimum during measurement.

In the arrangement of Figure 3, neither terminal 24b nor 26b of the unknown impedance 22b need be connected to the common circuit; however, when a null indication is given by the measurement 30b, the terminal 26b is at the same alternating voltage as that of the common circuit.

Figure 4:
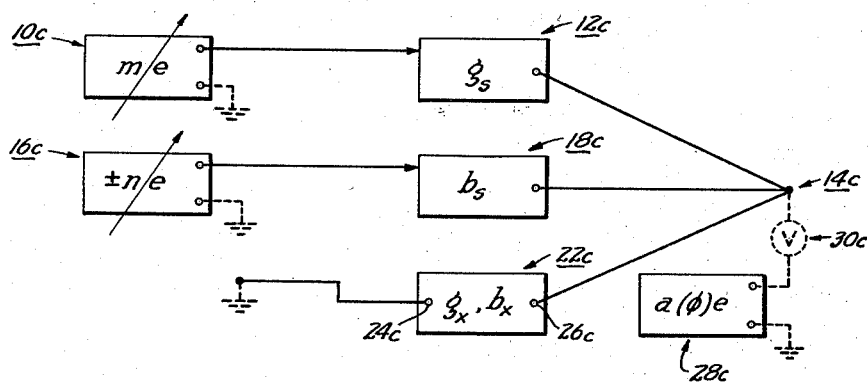

Figure 4 illustrates an arrangement somewhat similar to that of Figure 2 in that the voltage at the reference point 14c is measured with respect to a comparison voltage 28c, but in which the terminal 24c of the unknown 22c is connected to the common circuit, i. e. to a zero voltage; so that "$p$" equals zero. The voltages 10c and 16c are fed through the standard elements 12c and 18c, respectively, to the reference point 14c, and its voltage is measured with respect to the comparison voltage 28c by a suitable measuring device 30c connected between them.

The voltages 10c and 16c are adjusted until a null is indicated by the instrument 30c showing that the voltage of the connection 14c has been equalized with the comparison voltage 28c. The frequency of the voltage 28c is the same as that of the voltage 10c and 16c, however, its phase and magnitude may be varied. The voltage 28c may have a voltage of "$a(\phi)e$."

Because in this method the coefficient "$p$" is equal to zero, the Equations 3 and 4 simplify to the form shown below:

$$g_x = \frac{m - a(\phi)}{-a(\phi)} g_s \quad (9)$$

$$b_x = \frac{\pm n - a(\phi)}{-a(\phi)} b_s \quad (10)$$

These equations show that this method enables the rapid determination of the value of the conductance and susceptance of the unknown impedance in terms of the standard conductance and susceptance elements 12c and 18c. It will be noted that the comparison voltage 28c may have a phase angle with respect to the voltages from the sources 10c and 12c. However, in order to facilitate the determination of the values of the susceptance and conductance, the phase of the voltage 28c may be fixed to be exactly in phase or out of phase with respect to the voltages 10c and 16c, i. e. to have a "+" or "—" value with respect thereto, whereby the Equations 9 and 10 above become further simplified as shown below so that "$g_x$" and "$b_x$" become merely some fractional value of $g_s$ and $b_s$, respectively.

$$g_x = \frac{m \mp a}{\mp a} g_s \quad (11)$$

$$b_x = \frac{\pm n \mp a}{\mp a} b_s \quad (12)$$

Figure 5:
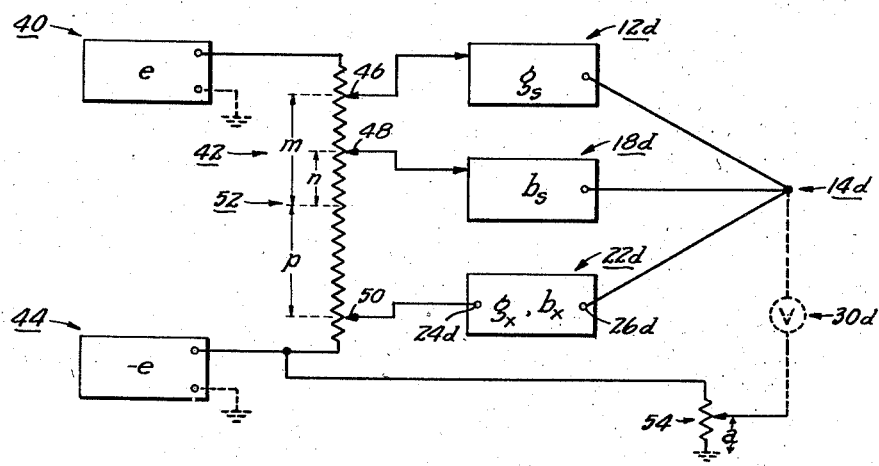

Figure 5 shows another arrangement in which the voltage from a first source 40, which for example may have a value of "$e$," is fed through an adjustable voltage-dividing means, generally indicated at 42, and the voltage from a second source 44, which may have a value of "$-e$" (i. e. 180° out of phase with the first voltage) is also fed through the means 42. The energizing voltages "$me$" and "$ne$" for the standard elements 12d and 18d, respectively, and the voltage "$pe$" for the unknown impedance 22d are applied from the means 42 to the standard elements and to the unknown 22d, respectively. For example, the voltage-dividing means may be one or more inductance dividers with continuously adjustable sliding contacts or one or more resistance dividers. The coefficients of the various energizing voltages may be determined by the settings of the sliding contacts on their voltage-dividing means.

In order to facilitate the measurement, I prefer to have a predetermined relationship between the setting of any of the adjustable contacts on its voltage-dividing means and the fractional part of the voltage 40 or 44 which is supplied through the various elements 12d and 18d and through the unknown impedance 22d to the common connection 14d.

Assuming that the voltage-dividing means 42 has three adjustable contacts 46, 48, and 50 and is arranged to have a linear position-voltage relationship for the various contacts, then its central portion 52 is at zero potential with respect to the common ground circuit. Hence, the relative position "$m$" of the contact 46 with respect to this central portion 52 determines the energizing voltage "$me$" fed through the standard element 12d. Likewise, the relative positions "$n$" and "$p$" of the contacts 48 and 50, respectively, determine the voltages fed through the standard element 18d and to terminal 24d of the unknown 22d, respectively. When any one of the connections 46, 48, or 50 is on the upper half of the voltage-dividing means 42, which is connected to the voltage 40, the corresponding energizing voltage fed to the common connection 14d is positive and vice versa when on the lower half of the means 42.

A reference voltage "$-ae$" is provided from a voltage-dividing means 54 connected between the voltage 44 and ground, and a measurement 56 is made between the common connection 14d and the voltage-dividing means 54.

With this arrangement, the voltage "$-ae$" may be at ground potential, in which case Equations 5 and 6 apply, or the contact 50 may be adjusted to the potential of the common circuit, so that Equations 11 and 12 may apply. Alternatively, neither of these voltages may be at zero in which case more generalized equations apply, as follows:

$$g_x = \frac{m - a}{p - a} g_s \quad (13)$$

$$b_x = \frac{\pm n - a}{p - a} b_s \quad (14)$$

These equations are similar to Equations 3 and 4 except for the phase of the coefficient "$a$." It may be either in phase or out of phase with the voltage 40, i. e. "+" or "—" depending upon whether the voltage-dividing means 54 is connected to the voltage 40 or 44, the later connection being shown.

From the foregoing it will be clear that the term voltage source does not necessarily indicate a separate power supply or generator; for example, a single voltage-divider network can be made to provide a number of voltage sources from a single primary supply. Other arrangements including electronic regulator circuits may provide the necessary voltage sources. It will be apparent that many widely different types of apparatus can be constructed for carrying out the method set forth above and that such apparatus can be manipulated automatically or by hand. One apparatus useful in performing this method is described in my copending application Serial No. 319,089, filed November 1, 1952. Another apparatus useful in applying the present method is described in the copending application of Smith-Vaniz, Jr., Serial No. 318,445, filed November 3, 1952, now Patent No. 2,757,336.

I claim:

The method of measuring an unknown impedance comprising the steps of applying a first alternating voltage through a circuit having a fixed and known conductance to a reference point, applying a second alternating voltage of the same frequency through a circuit having a fixed and known reactance to the same reference point, applying a third alternating voltage of the same frequency through the unknown impedance to the same reference point, generating a fourth voltage of the same frequency as the other voltages and having a known phase opposite to the phase of the third voltage and magnitude substantially equal to the magnitude of the third voltage, and independently adjusting the magnitude of the first voltage and the magnitude and phase of the second voltage to produce a voltage at the reference point which is equal to said fourth voltage, thereby to determine the conductance and susceptance of the unknown impedance in terms of the conductance and susceptance of said conductance and susceptance circuits, respectively, while minimizing any stray capacity effects due to the unknown impedance.

References Cited in the file of this patent

UNITED STATES PATENTS

| | | |
|---|---|---|
| 2,569,691 | Roberts | Oct. 2, 1951 |
| 2,617,857 | Secker | Nov. 11, 1952 |